United States Patent
Hu et al.

(10) Patent No.: US 11,520,174 B2
(45) Date of Patent: Dec. 6, 2022

(54) PHOTONIC CRYSTAL, DISPLAY PANEL, LIGHT CONVERSION DEVICE AND GLASSES

(71) Applicants: BEIJING BOE DISPLAY TECHNOLOGY CO., LTD., Beijing (CN); BOE TECHNOLOGY GROUP CO., LTD., Beijing (CN)

(72) Inventors: Weipin Hu, Beijing (CN); Yinglong Huang, Beijing (CN); Jun Wu, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 490 days.

(21) Appl. No.: 16/605,974

(22) PCT Filed: Apr. 18, 2019

(86) PCT No.: PCT/CN2019/083278
§ 371 (c)(1),
(2) Date: Oct. 17, 2019

(87) PCT Pub. No.: WO2019/206021
PCT Pub. Date: Oct. 31, 2019

(65) Prior Publication Data
US 2021/0405400 A1  Dec. 30, 2021

(30) Foreign Application Priority Data
Apr. 26, 2018  (CN) .......................... 201810389359.0

(51) Int. Cl.
*G02F 1/03* (2006.01)
*G02B 1/00* (2006.01)
*G02B 27/01* (2006.01)

(52) U.S. Cl.
CPC .......... *G02F 1/0338* (2013.01); *G02B 1/005* (2013.01); *G02B 27/0172* (2013.01); *G02B 2027/0178* (2013.01); *G02F 2202/32* (2013.01)

(58) Field of Classification Search
CPC ... G02F 1/0338; G02F 2202/32; G02B 1/005; G02B 27/0172; G02B 2027/0178
(Continued)

(56) References Cited

U.S. PATENT DOCUMENTS 8,102,588 B2  1/2012  Alameh et al.
10,267,964 B2  4/2019  Zhang
(Continued)

FOREIGN PATENT DOCUMENTS

CN  101479649  7/2009
CN  104865732  8/2015
(Continued)

OTHER PUBLICATIONS

Chinese Office Action dated Jan. 14, 2020 corresponding to Chinese Application No. 201810389359.0; 18 pages.

*Primary Examiner* — Collin X Beatty
(74) *Attorney, Agent, or Firm* — Leason Ellis LLP

(57) ABSTRACT

A photonic crystal, a light conversion device, a display panel, and a pair of glasses are provided. The photonic crystal of the embodiment of the present disclosure includes first dielectric layers and second dielectric layers having different refractive indexes, and the first dielectric layers and the second dielectric layers are alternately stacked. A thickness and a refractive index of each of the first dielectric layers and a thickness and a refractive index of each of the
(Continued)

second dielectric layers are configured such that the photonic crystal blocks blue light with a wavelength of 420 nm to 470 nm incident into the photonic crystal from passing through the photonic crystal.

13 Claims, 2 Drawing Sheets

(58) Field of Classification Search
USPC .......................................................... 359/245
See application file for complete search history.

(56) References Cited

U.S. PATENT DOCUMENTS

| | | |
|---|---|---|
| 2003/0186139 A1 | 10/2003 | Nagao |
| 2009/0272964 A1 | 11/2009 | Yao et al. |
| 2009/0323014 A1* | 12/2009 | Cunningham ......... G02B 1/005 |
| | | 351/44 |
| 2010/0091224 A1 | 4/2010 | Cho et al. |
| 2016/0062178 A1 | 3/2016 | Kim et al. |
| 2017/0168204 A1* | 6/2017 | Zhang ............... G02F 1/133617 |
| 2018/0224575 A1 | 8/2018 | Marck et al. |
| 2020/0152683 A1* | 5/2020 | Akiyama ............... G02B 5/201 |

FOREIGN PATENT DOCUMENTS

| | | |
|---|---|---|
| CN | 106206967 | 12/2016 |
| CN | 107924070 | 4/2018 |
| CN | 108594345 | 9/2018 |

* cited by examiner

PHOTONIC CRYSTAL, DISPLAY PANEL, LIGHT CONVERSION DEVICE AND GLASSES

CROSS-REFERENCE TO RELATED PATENT APPLICATIONS

This application is a U.S. National Stage Application under 35 U.S.C. § 371 of International Patent Application No. PCT/CN2019/083278, filed Apr. 18, 2019, which claims the priority of the Chinese Patent Application No. 201810389359.0 filed on Apr. 26, 2018, both of which are incorporated by reference in their entireties.

TECHNICAL FIELD

The present disclosure relates to a photonic crystal, a display panel, a light conversion device and a pair of glasses.

BACKGROUND

With advancement of electronic technology, digital devices such as computers, liquid crystal display televisions, and smart phone portable game consoles with liquid crystal display panels have entered daily lives of people. When viewing a light conversion device including a liquid crystal display panel for a long time, blue light of light emitted from the liquid crystal display panel may adversely affect the human eyes, especially that short-wave blue light with a wavelength of 420 nm to 470 nm may increase amount of toxins in a macular region of the human eyes, causing macular degeneration in the eyes, which seriously threatens eyes health.

SUMMARY

Embodiments of the present disclosure provide a photonic crystal, a display panel, a light conversion device and a pair of glasses.

At least one embodiment of the present disclosure provides a photonic crystal including first dielectric layers and second dielectric layers having different refractive indexes, and the first dielectric layers and the second dielectric layers are alternately stacked. A thickness and a refractive index of each of the first dielectric layers and a thickness and a refractive index of each of the second dielectric layers are configured such that the photonic crystal blocks blue light with a wavelength of 420 nm to 470 nm incident into the photonic crystal from passing through the photonic crystal.

For example, the refractive index of each of the first dielectric layers is $n_1$, the thickness of each of the first dielectric layers is $h_1$, the refractive index of each of the second dielectric layers is $n_2$, the thickness of each of the second dielectric layers is $h_2$, $n_1 \ast h_1 = n_2 \ast h_2 = \lambda_0/4$, and $\lambda_0$ is in a range of 440 nm to 455 nm.

For example, a ratio of the refractive index of each of the first dielectric layers to the refractive index of each of the second dielectric layers is 1.2 to 1.4.

For example, the ratio of the refractive index of each of the first dielectric layers to the refractive index of each of the second dielectric layers is in a range of 1.25 to 1.35.

For example, the first dielectric layers and the second dielectric layers are both fabricated by an optical thin film preparation technology.

For example, the refractive index of each of the first dielectric layers is in a range of 1.8 to 2.0, and the refractive index of each of the second dielectric layers is in a range of 1.3 to 1.5.

For example, a material of the first dielectric layers includes silicon nitride, and a material of the second dielectric layers include silicon oxide.

For example, the thickness of each of the first dielectric layers is in a range of 55 nm to 60 nm, and the thickness of each of the second dielectric layers is in a range of 75 nm to 85 nm.

For example, a count of the first dielectric layers is the same as a count of the second dielectric layers.

Another embodiment of the present disclosure provides a light conversion device including a light conversion layer and the photonic crystal described above. The light conversion layer is configured to transmit a portion of first color incident light and to make another portion of the first color incident light pass through the light conversion layer to emit light of at least one other color. A wavelength of the first color incident light is smaller than a wavelength of the light of at least one other color, and the photonic crystal is disposed at a light emit side of the light conversion layer.

For example, the light conversion layer includes a quantum dot material or a fluorescent material.

Another embodiment of the present disclosure provides a display panel including the photonic crystal described above, and the photonic crystal is located at a light emit side of the display panel.

Another embodiment of the present disclosure provides a pair of glasses including lenses and the photonic crystal described above. The photonic crystal is stacked on the lenses.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
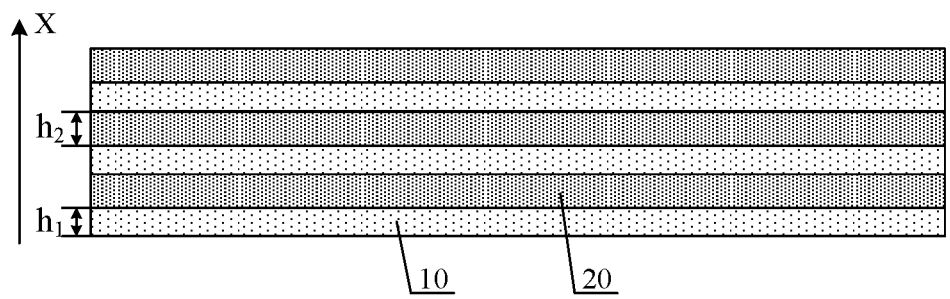
FIG. 1 is a schematic diagram of a structure of a photonic crystal according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

In a study, an inventor of the present application has found that although a general display panel can filter out short-wave blue light, it also filters out a portion of visible light that is not short-wave blue light while filtering out the short-wave blue light, which seriously affects display brightness of the display panel.

Embodiments of the present disclosure provide a photonic crystal, a display panel, a light conversion device and a pair of glasses. The photonic crystal includes first dielectric layers and second dielectric layers having different refractive indexes, and the first dielectric layers and the second dielectric layers are alternately stacked. The photonic crystal is configured to block blue light with a wavelength of 420 nm to 470 nm incident into the photonic crystal from passing through the photonic crystal by setting a thickness and a refractive index of the first dielectric layers and a thickness and a refractive index of the second dielectric layers. The photonic crystal provided by at least one embodiment of the present disclosure can block the blue light having the wavelength of 420 nm to 470 nm from passing through the photonic crystal, that is, in a case where the short-wave blue light with the wavelength of 420 nm to 470 nm is irradiated onto the photonic crystal, the short-wave blue light cannot pass through the photonic crystal. For example, the photonic crystal can block the blue light with the wavelength of 420 nm to 470 nm from emitting by disposing the photonic crystal on a light emit side of a display panel, thereby avoiding damage of the blue light with the wavelength of 420 nm to 470 nm to human eyes, protecting the human eyes, and achieving a healthy display. At the same time, visible light with a wavelength other than a range of 420 nm to 470 nm of the display panel can be normally emitted, and high transmittance of the photonic crystal also increases the transmittance of the visible light with the wavelength other than the range of 420 nm to 470 nm, thereby improving display brightness of the display panel.

The photonic crystal, the display panel, the light conversion device, and the glasses provided by the embodiments of the present disclosure will be specifically described below with reference to the accompanying drawings.

FIG. 1 is a schematic diagram of a structure of a photonic crystal according to an embodiment of the present disclosure. As shown in FIG. 1, the photonic crystal of the embodiment of the present disclosure includes first dielectric layers 10 and second dielectric layers 20 having different refractive indexes, and the first dielectric layers 10 and the second dielectric layers 20 are alternately stacked. A thickness and a refractive index of the first dielectric layers 10 and a thickness and a refractive index of second dielectric layers 20 are configured such that the photonic crystal can block blue light with a wavelength of 420 nm to 470 nm incident into the photonic crystal from passing through the photonic crystal.

The photonic crystal is an artificially designed and fabricated crystal with a periodic dielectric structure on the optical scale. In a case where light propagates in the photonic crystal, it interacts with the periodic structure of the photonic crystal, so as to generate a band gap, that is, the photonic crystal has a photonic band gap. The photonic band gap is a frequency region. Upon the light in a range of the photonic band gap being irradiated onto the photonic crystal, the light cannot pass through the photonic crystal, but produces total reflection on a surface of the photonic crystal. For example, the band gap of the photonic crystal can be calculated in a wavelength range of the light in which the transmittance is less than 0.1%.

The photonic crystal provided by the embodiment of the present disclosure is used for blocking the blue light with the wavelength of 420 nm to 470 nm from passing through the photonic crystal. That is, in a case where the short-wave blue light with the wavelength of 420 nm to 470 nm is irradiated onto the photonic crystal, the short-wave blue light cannot pass through the photonic crystal. For example, upon the photonic crystal provided by the embodiment of the present disclosure being disposed on a light emit side of the display panel, the short-wave blue light with the wavelength of 420 nm to 470 nm emitted by the display panel is blocked by the photonic crystal (a material of the photonic crystal has nearly 100% reflectivity for the light with a wavelength within the band gap), so that the short-wave blue light will not enter the human eyes, and the damage to the human eye caused by the short-wave blue light is avoided. Meanwhile, the photonic crystal provided by the embodiment of the present disclosure does not block the visible light with the wavelength other than a range of 420 nm to 470 nm from passing through the photonic crystal, and has high transmittance characteristics which are beneficial to improving the transmittance of the visible light with the wavelength other than the range of 420 nm to 470 nm. The display panel including the photonic crystal provided by the embodiment of the present disclosure has higher display brightness than the display panel that generally filters out the short-wave blue light.

For example, as shown in FIG. 1, the first dielectric layers 10 and the second dielectric layers 20 are alternately stacked in a first direction X, and a count of the first dielectric layers 10 is the same as a count of the second dielectric layers 20. The first direction is a stacking direction of the first dielectric layers 10 and the second dielectric layers 20. The refractive index of the photonic crystal provided by the embodiment of the present disclosure has a periodic variation in the first direction X, and the periodic variation of the refractive index produces a band gap structure of the photonic crystal. The photonic crystal provided by the embodiment of the present disclosure is a one-dimensional photonic crystal, and the band gap of the photonic crystal appears in the first direction X. Light with a frequency within the band gap cannot pass through the photonic crystal in the first direction but is uniform in the other two directions.

Figure 2:
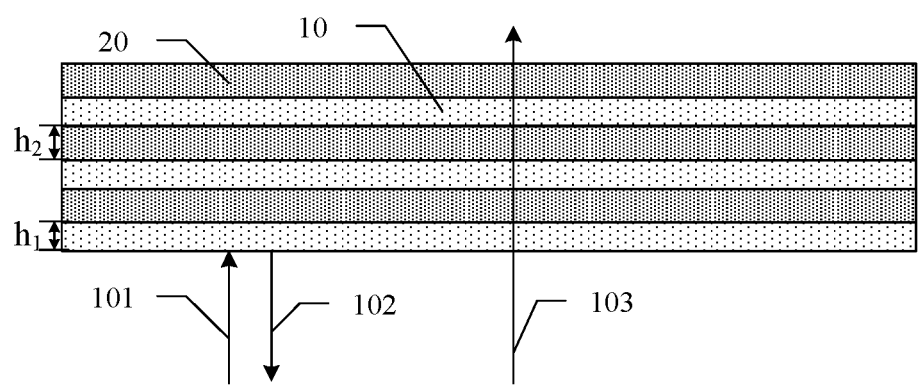
FIG. 2 is a schematic diagram of a light path of light irradiated onto the photonic crystal shown in FIG. 1.

For example, FIG. 2 is a schematic diagram of a light path of light including the blue light with the wavelength λ of 420 nm to 470 nm irradiated onto the photonic crystal shown in FIG. 1. As shown in FIG. 2, a first portion of the incident light 101 is the blue light with the wavelength λ of 420 nm to 470 nm, and a second portion of the incident light 103 is light with a wavelength other than a range of 420 nm to 470 nm. In a case where the first portion of the incident light 101 and the second portion of the incident light 103 are incident on the surface of the photonic crystal, the first portion of the incident light 101 does not exit from the photonic crystal, that is, the short-wave blue light does not pass through the photonic crystal but is totally reflected by the photonic crystal. However, the second portion of the incident light 103, that is, the light with the wavelength other than the range of 420 nm to 470 nm can normally pass through the photonic crystal and continue to propagate in an original direction.

For example, in the embodiment of the present disclosure, the refractive index of the first dielectric layers 10 is $n_1$, the thickness of the first dielectric layers 10 is $h_1$, the refractive index of the second dielectric layers 20 is $n_2$, and the thickness of the second dielectric layers 20 is $h_2$, then the period p of the photonic crystal satisfies a relation $p=h_1+h_2$. A count of periods of the photonic crystal shown in FIG. 1 and FIG. 2 is 3. It is easily understood that, in a specific implementation, the count of periods of the photonic crystal is not limited to 3, and the count of periods of the photonic crystal can be set as needed.

For example, the product of a path of light passing through a medium and a refractive index of the medium is an optical path of the medium. The wavelength corresponding to an intermediate point of the band gap of the photonic crystal is a center wavelength of the band gap of the photonic crystal, which can reflect a relative position of the band gap. The thickness design of each film layer in the photonic crystal needs to be calculated according to the center wavelength, and the calculation formula is $d=n*h=\lambda_0/4$.

According to the principle of multi-beam interference, in a case where refractive indexes of mediums on both sides of the film layer are greater or less than a refractive index of the film layer, assuming that a phase difference in reflected beams of the film layer is equal to π (the optical path difference is equal to $\lambda_0/2$, when only the first two beams are counted, the additional optical path difference $\lambda_0/2$ should be added, so that the total optical path difference is $\lambda_0$), the reflected light with this wavelength $\lambda_0$ obtains the strongest reflection.

The center wavelength of the photonic band gap of the one-dimensional photonic crystal in the embodiment of the present disclosure is related to the refractive indexes and the thicknesses of the two medias, and they satisfy the relationship of $n_1*h_1=n_2*h_2=\lambda_0/4$. $n_1$ is the refractive index of the first dielectric layers 10, $n_2$ is the refractive index of the second dielectric layers 20, $h_1$ is the thickness of the first dielectric layers 10, $h_2$ is the thickness of the second dielectric layers 20, and $\lambda_0$ is the center wavelength of the photonic band gap. In the embodiment of the present disclosure, in order to make the photonic band gap of the photonic crystal be in the wave band range of 420 nm to 470 nm, the center wavelength $\lambda_0$ may be 440 nm to 455 nm. In the embodiment of the present disclosure, the photonic band gap of the photonic crystal is a wavelength range centered on $\lambda_0$. Because a wave band having the most energetic in the short-wave blue light is in the range of 440 nm to 455 nm, the wave band range of 420 nm to 470 nm in which the photonic band gap of the photonic crystal in the embodiment of the present disclosure is located includes the blue light wavelength having the most energetic. Therefore, the photonic crystal in the embodiment of the present disclosure can block the blue light having high energy in the light with the wavelength of 420 nm to 470 nm passing through the photonic crystal, and avoid the blue light having high energy in the short-wave blue light to cause damage to the human eyes.

For example, a ratio $n_1/n_2$ of the refractive index of the first dielectric layers 10 to the refractive index of the second dielectric layers 20 can be in a range of 1.2 to 1.4, thereby the wave band range included in the photonic band gap is approximately a range of 420 nm to 470 nm.

For example, the ratio $n_1/n_2$ of the refractive index of the first dielectric layers 10 to the refractive index of the second dielectric layers 20 can be in a range of 1.25 to 1.35, so that the wave band range included in the photonic band gap is closer to the range of 420 nm to 470 nm. Thus, the probability that the photonic crystal blocks the light with the wavelength other than the range of 420 nm to 470 nm is lowered, and the brightness of the display panel including the above photonic crystal can be improved.

For example, the refractive index of the first dielectric layers 10 is greater than the refractive index of the second dielectric layers 20, the refractive index $n_1$ of the first dielectric layers 10 is in a range of 1.8 to 2.0, and the refractive index $n_2$ of the second dielectric layers 20 is in a range of 1.3 to 1.5. Embodiments of the present disclosure are not limited to the refractive index of the first dielectric layers being greater than the refractive index of the second dielectric layers, and the refractive index ranges of the two dielectric layers can be interchanged.

For example, a material of the first dielectric layers 10 can include silicon nitride, and a material of the second dielectric layers 20 can include silicon oxide. The embodiment is not limited thereto, and the materials of the two dielectric layers may be other materials that satisfy the above refractive index.

For example, the refractive index $n_1$ of the first dielectric layers 10 can be 1.931, and the refractive index $n_2$ of the second dielectric layers 20 can be 1.471, then $n_1/n_2=1.31$.

For example, the thickness $h_1$ of the first dielectric layers 10 can be in a range of 55 nm to 60 nm, and the thickness $h_2$ of the second dielectric layers 20 can be in a range of 75 nm to 85 nm.

For example, the thickness $h_1$ of the first dielectric layers 10 can be 58 nm, and the thickness $h_2$ of the second dielectric layers 20 can be 79 nm.

According to the refractive indexes and the thicknesses of the above dielectric layers, and the formula $n_1*h_1=n_2*h_2=\lambda_0/4$, it is found that $\lambda_0$ is 447 nm, that is, the center wavelength of the wave band range in which the photonic band gap of the photonic crystal provided by the embodiment of the present disclosure is located is 447.

Figure 3A:
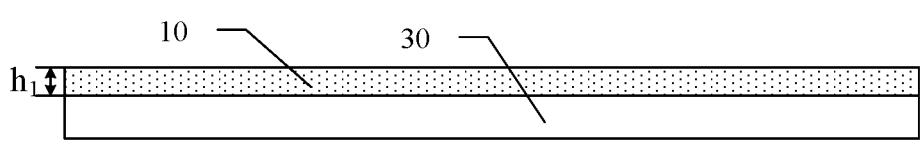
FIG. 3a is a schematic diagram of a structure after forming one first dielectric layer on a base.
Figure 3B:
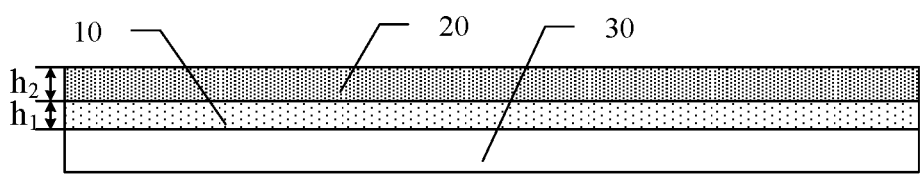
FIG. 3b is a schematic diagram of a structure after forming one second dielectric layer.
Figure 3C:
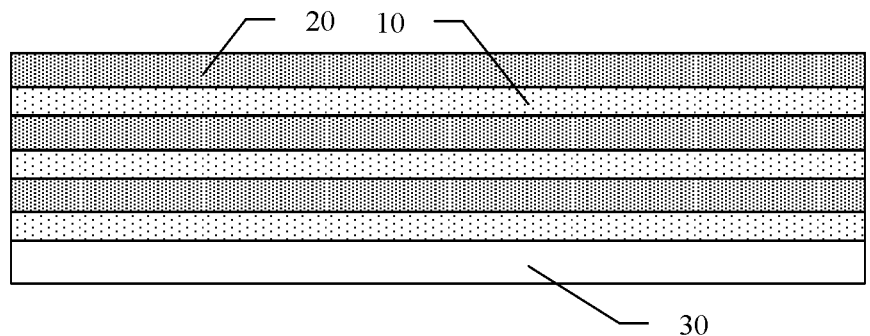
FIG. 3c is a schematic diagram of a structure after forming a photonic crystal.

For example, FIG. 3a to FIG. 3c are schematic views of processes for preparing the photonic crystal shown in FIG. 1. When fabricating the photonic crystal in the embodiment of the present disclosure, the photonic crystal can be fabricated on a base using an optical thin film preparation technology. Using the optical thin film preparation technology can strictly control the film thickness of the first dielectric layers and the film thickness of the second dielectric layers, and the thickness of the film can be up to the nanometer level. The optical thin film preparation technology can be used to prepare a photonic crystal with transmission wavelength in the visible light wave range to ensure accuracy of the photonic band gap of the photonic crystal. The optical thin film preparation technology includes physical vapor deposition and chemical liquid deposition. For example, the embodiment of the present disclosure can use the physical vapor deposition to prepare the photonic crystal.

For example, FIG. 3a is a schematic diagram of a structure after forming one first dielectric layer on the base. As shown in FIG. 3a, one layer of the first dielectric layers 10 can be formed on a surface of the base 30 using the optical thin film preparation technology, and the first dielectric layer 10 has a thickness $h_1$.

For example, FIG. 3b is a schematic diagram of a structure after forming one second dielectric layer, and FIG. 3c is a schematic diagram of a structure after forming the photonic crystal. As shown in FIG. 3b, one layer of the second dielectric layers 20 is formed on a side of the first dielectric layer 10 away from the base 30, and the thickness of the second dielectric layer 20 is $h_2$. As shown in FIG. 3c, the first dielectric layers 10 and the second dielectric layers 20 are alternately formed periodically in order to prepare the photonic crystal as shown in FIG. 3c.

For example, after the photonic crystal is formed, the base 30 may be peeled off or the base 30 may not be peeled off, and the barrier properties of the photonic crystal to the blue light with the wavelength of 420 nm to 470 nm are not affected. In a case that the base 30 is not peeled off, the refractive index of the base 30 is smaller than the refractive index of the first dielectric layers.

For example, a material of the base 30 is a glass substrate, and a transparent material such as polydimethylsiloxane (PDMS) or polymethyl methacrylate (PMMA) may be used to be the base 30, so as to prevent the base 30 from affecting the light transmittance. The base material of the base is not limited thereto, and may be selected according to actual needs.

In an embodiment of the present disclosure, both the first dielectric layers 10 and the second dielectric layers 20 are formed using a surface deposition process in the optical thin film preparation technology.

For example, in the process of preparing the photonic crystal in FIGS. 3a to 3c, it is not limited that the first dielectric layer is firstly formed on the base, and the second dielectric layer may be firstly formed on the base, and then the first dielectric layer is formed on the second dielectric layer. Then the second dielectric layers and the first dielectric layers are alternately formed until the photonic crystal is finally formed.

Figure 4:
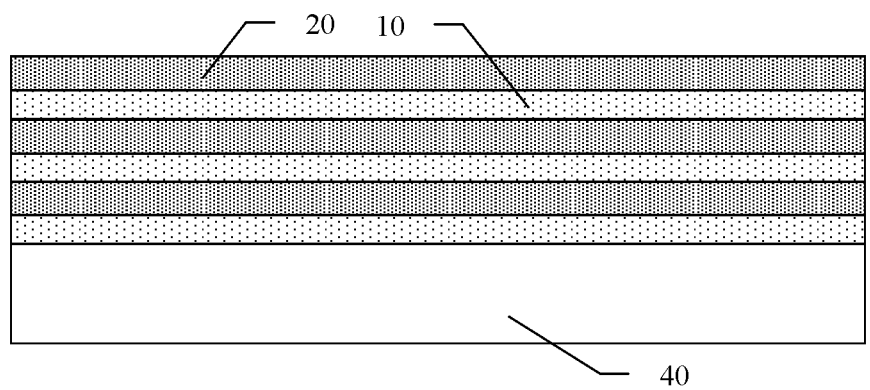
FIG. 4 is a schematic diagram of a partial structure of a display panel according to another embodiment of the present disclosure.

For example, FIG. 4 is a schematic diagram of a partial structure of a display panel according to another embodiment of the present disclosure. As shown in FIG. 4, the display panel includes a display substrate 40 and the photonic crystal provided in the above embodiment. The display substrate 40 may be an array substrate of the OLED display panel or a color filter substrate of the liquid crystal display panel, which is not limited in the embodiment of the present disclosure. The photonic crystal is located at a light emit side of the display panel such that light emitted from the display panel enters the human eyes after passing through the photonic crystal. Because the photonic crystal can selectively block the blue light with the wavelength of 420 nm to 470 nm from passing through, the blue light with the above-mentioned wave band is not included in the image light by the display panel, and the display panel can effectively filter the short-wave blue light harmful to the human eyes, thereby achieving the purpose of protecting the human eyes.

The display panel proposed by the embodiment of the present disclosure can be any product or component having a display function, such as a mobile phone, a tablet computer, a television, a display, a notebook computer, a digital photo frame, a navigator, and the like.

For example, in the embodiment of the present disclosure, the photonic crystal is disposed on the light emit side of the display panel, that is, the photonic crystal can be disposed at the light emit side of the backlight of the display panel, and the photonic crystal can also be disposed at the light emit side of the display surface of the display panel, the technical solution that the position where the photonic crystal is disposed can be used to block the short-wave blue light of the display panel from entering the human eyes falls within the protection range of the embodiments of the present disclosure.

The display panel in the embodiment of the present disclosure can block the blue light with the wavelength of 420 nm to 470 nm by disposing the photonic crystal on the light emit side thereof, thereby avoiding the damage of the blue light with the wavelength of 420 nm to 470 nm to the human eyes, protecting the human eyes, and achieving a healthy display. At the same time, visible light with a wavelength other than a range of 420 nm to 470 nm of the display panel can be normally emitted, and high transmittance of the photonic crystal also increases the transmittance of the visible light with the wavelength other than the range of 420 nm to 470 nm, thereby improving display brightness of the display panel.

Figure 5:
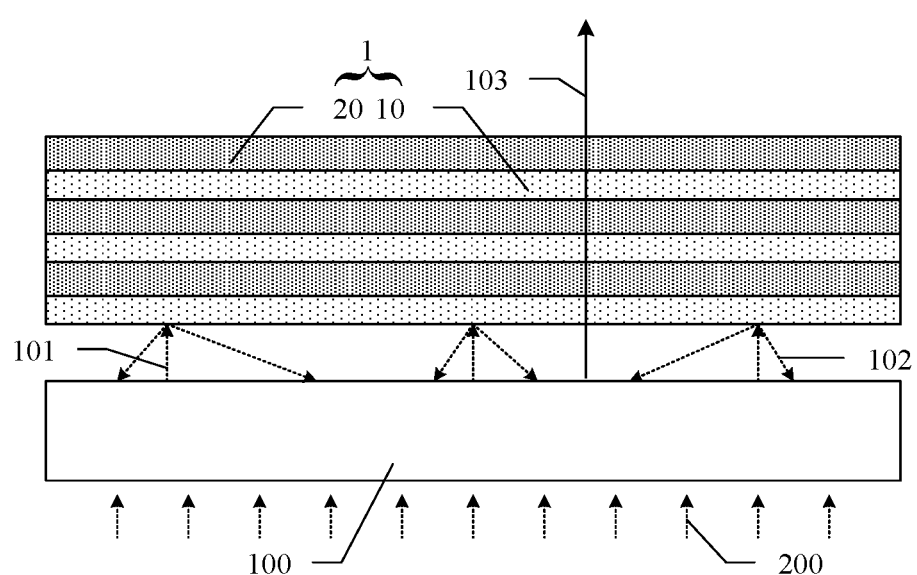
FIG. 5 is a schematic diagram of a partial structure of a light conversion device according to another embodiment of the present disclosure.

For example, FIG. 5 is a schematic diagram of a partial structure of a light conversion device according to another embodiment of the present disclosure. As shown in FIG. 5, the light conversion device can include a light conversion layer 100 and a photonic crystal 1 located at a light emit side of the light conversion layer 100. The light conversion layer 100 is configured to transmit a portion of first color incident light and make another portion of the first color incident light pass through the light conversion layer 100 to emit light of at least one other color. A wavelength of the first color incident light is smaller than a wavelength of the light of at least one other color. After the light emitted from the light conversion layer is incident on the photonic crystal, the blue light with a wavelength of 420 nm to 470 nm is reflected back to the light conversion layer for reuse.

For example, the light conversion layer 100 includes a quantum dot material or a fluorescent material.

For example, the first color incident light is blue light, and the light of at least one other color includes red light and green light.

For example, the quantum dot material may be a mixed quantum dot material, and the mixed quantum dot material includes a mixed material of a green quantum dot material and a red quantum dot material to cause the incident light (blue light) incident on the light conversion layer 100 to emit the red light and the green light after passing through the light conversion layer 100.

For example, the first color incident light is blue light, and the light of at least one other color includes yellow light. The first color incident light excites the quantum dot material to emit the yellow light, and the blue light and the yellow light mix to form white light.

For example, the light conversion device may be a portion of a backlight module, a color film substrate, a portion of an illumination source, or a portion of a display device, which is not limited in the embodiment of the present disclosure.

For example, the light conversion device provided by the embodiment of the present disclosure can include the display panel shown in FIG. 4, the side of the display panel close to the photonic crystal includes the light conversion layer, and FIG. 5 only schematically illustrates the light conversion layer and the photonic crystal.

For example, as shown in FIG. 5, because the photonic crystal 1 blocks the blue light with the wavelength $\lambda$ of 420 nm to 470 nm from passing through the photonic crystal 1, the blue light with the wavelength $\lambda$ of 420 nm to 470 nm in the light emitted from the light conversion layer 100 (for example, a photoluminescence quantum dot structure) is almost completely reflected after being irradiated to the photonic crystal 1, and the reflected blue light can be reused to excite the light conversion layer 100 to emit light, so as to improve luminous efficiency of, for example, a photoluminescent quantum dot structure. The abovementioned photoluminescence quantum dot structure can be a quantum dot film or a quantum dot color film.

For example, the photoluminescent quantum dot structure can be excited by the blue light to emit light of other colors.

For example, the quantum dot material is a photoluminescence quantum dot material such as CdSe, CdTe, or graphene. For example, a luminescence peak of blue quantum dots ranges from 440 nm to 460 nm. A luminescent peak of green quantum dots ranges from 510 nm to 540 nm, and a luminescent peak of red quantum dots ranges from 630 nm to 670 nm. For example, the blue quantum dots are excited to emit the blue light, the green quantum dots are excited to emit the green light, and the red quantum dots are excited to emit the red light.

For example, the light conversion device can further include a light source 200 disposed on a side opposite to the light emit side of the light conversion layer 100 (ie, a light incident side). The light emitted by the light source 200 is used to excite the light conversion layer 100 to emit light. The blue light with the wavelength $\lambda$ of 420 nm to 470 nm in the light emitted from the light conversion layer 100 is almost completely reflected into the light conversion layer 100 when encountering the photonic crystal 1, and the light conversion layer 100 is again excited to emit light, thereby improving the luminous efficiency.

For example, the light conversion device is a photoluminescence quantum dots structure device, such as a QLED.

Another embodiment of the present disclosure proposes a pair of glasses on which the photonic crystal of the above embodiment is disposed, so that the glasses can prevent the blue light with the wavelength of 420 nm to 470 nm from being incident on the human eyes to cause damage to the human eyes.

In the description of the embodiments of the present disclosure, it is to be understood that the terms "middle", "on", "under", "front", "back", "vertical", "horizontal", "top", "bottom", "inside", "outside" and the like indicating orientation or position relationship are based on the orientation or position relationship shown in the drawings, and are merely for the convenience of the description of the disclosure and simplifying description, rather than indicating or implying that the device or component referred to must be constructed and operated in a particular orientation, and is not to be construed as limiting the disclosure.

In the description of the embodiments of the present disclosure, it should be noted that terms "mount", "connected", and "connect" are to be understood broadly, and may be, for example, a fixed connection or a removable connection, or integral connection; and it can be a mechanical connection or an electrical connection; and it can be directly connected or indirectly connected through an intermediate medium, which can be an internal connection between two elements. The specific meanings of the above terms in the present disclosure can be understood in the specific circumstances by those skilled in the art.

The embodiments disclosed in the present disclosure are as described above, but are merely used to facilitate the understanding of the present disclosure, and are not intended to limit the present disclosure. Any modification or variation in the form and details of the implementation may be made by those skilled in the art without departing from the spirit and scope of the disclosure. The scopes are defined by the appended claims.

The following statements should be noted:

(1) Unless otherwise defined, the same reference numeral represents the same meaning in the embodiments of the disclosure and accompanying drawings.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A photonic crystal, comprising first dielectric layers and second dielectric layers having different refractive indexes, the first dielectric layers and the second dielectric layers being alternately stacked,
   wherein a thickness and a refractive index of each of the first dielectric layers and a thickness and a refractive index of each of the second dielectric layers are configured such that the photonic crystal blocks blue light with a wavelength of 420 nm to 470 nm incident into the photonic crystal from passing through the photonic crystal,
   wherein the refractive index of each of the first dielectric layers is $n_1$, the thickness of each of the first dielectric layers is $h_1$, the refractive index of each of the second dielectric layers is $n_2$, the thickness of each of the second dielectric layers is $h_2$, $n_1*h_1=n_2*h_2=\lambda_0/4$, and $\lambda_0$ is in a range of 440 nm to 455 nm, the ratio of the refractive index of each of the first dielectric layers to the refractive index of each of the second dielectric layers is in a range of 1.25 to 1.35,
   a material of the first dielectric layers comprises silicon nitride, and a material of the second dielectric layers comprises silicon oxide,
   the thickness of each of the first dielectric layers is in a range of 55 nm to 60 nm, and the thickness of each of the second dielectric layers is in a range of 75 nm to 85 nm.

2. The photonic crystal according to claim 1, wherein the first dielectric layers and the second dielectric layers are both fabricated by an optical thin film preparation technology.

3. The photonic crystal according to claim 1, wherein the refractive index of each of the first dielectric layers is in a range of 1.8 to 2.0, and the refractive index of each of the second dielectric layers is in a range of 1.3 to 1.5.

4. The photonic crystal according to claim 1, wherein a count of the first dielectric layers is the same as a count of the second dielectric layers.

5. A display panel, comprising the photonic crystal according to claim 1, the photonic crystal being located at a light emit side of the display panel.

6. The display panel according to claim 5, wherein the refractive index of each of the first dielectric layers is in a range of 1.8 to 2.0, the refractive index of each of the second dielectric layers is in a range of 1.3 to 1.5.

7. A pair of glasses, comprising lenses and the photonic crystal according to claim 1, wherein the photonic crystal is stacked on the lenses.

8. The glasses according to claim 7, wherein the refractive index of each of the first dielectric layers is in a range of 1.8 to 2.0, the refractive index of each of the second dielectric layers is in a range of 1.3 to 1.5.

9. A light conversion device, comprising:
a light conversion layer and a photonic crystal, and the photonic crystal being disposed at a light emit side of the light conversion layer;
wherein the photonic crystal comprises first dielectric layers and second dielectric layers having different refractive indexes, the first dielectric layers and the second dielectric layers are alternately stacked, a thickness and a refractive index of each of the first dielectric layers and a thickness and a refractive index of each of the second dielectric layers are configured such that the photonic crystal blocks blue light with a wavelength of 420 nm to 470 nm incident into the photonic crystal from passing through the photonic crystal;
the light conversion layer is configured to transmit a portion of first color incident light and to make another portion of the first color incident light pass through the light conversion layer to emit light of at least one other color, and a wavelength of the first color incident light is smaller than a wavelength of the light of at least one other color,
wherein the refractive index of each of the first dielectric layers is $n_1$, the thickness of each of the first dielectric layers is $h_1$, the refractive index of each of the second dielectric layers is $n_2$, the thickness of each of the second dielectric layers is $h_2$, $n_1*h_1=n_2*h_2=\lambda_0/4$, and $\lambda_0$ is in a range of 440 nm to 455 nm, the ratio of the refractive index of each of the first dielectric layers to the refractive index of each of the second dielectric layers is in a range of 1.25 to 1.35,
a material of the first dielectric layers comprises silicon nitride, and a material of the second dielectric layers comprises silicon oxide,
the thickness of each of the first dielectric layers is in a range of 55 nm to 60 nm, and the thickness of each of the second dielectric layers is in a range of 75 nm to 85 nm.

10. The light conversion device according to claim 9, wherein the light conversion layer comprises a quantum dot material or a fluorescent material.

11. The light conversion device according to claim 9, wherein the first color incident light is blue light, and a wavelength of the first color incident light comprises a range of 420 nm to 470 nm.

12. The light conversion device according to claim 9, wherein the refractive index of each of the first dielectric layers is in a range of 1.8 to 2.0, the refractive index of each of the second dielectric layers is in a range of 1.3 to 1.5.

13. A photonic crystal, comprising first dielectric layers and second dielectric layers having different refractive indexes, the first dielectric layers and the second dielectric layers being alternately stacked,
wherein a thickness and a refractive index of each of the first dielectric layers and a thickness and a refractive index of each of the second dielectric layers are configured such that the photonic crystal blocks blue light with a wavelength of 420 nm to 470 nm incident into the photonic crystal from passing through the photonic crystal;
the refractive index of each of the first dielectric layers is $n_1$, the thickness of each of the first dielectric layers is $h_1$, the refractive index of each of the second dielectric layers is $n_2$, the thickness of each of the second dielectric layers is $h_2$, $n_1*h_1=n_2*h_2=\lambda_0/4$, and $\lambda_0$ is in a range of 440 nm to 455 nm;
the refractive index of each of the first dielectric layers is in a range of 1.8 to 2.0, the refractive index of each of the second dielectric layers is in a range of 1.3 to 1.5, the thickness of each of the first dielectric layers is in a range of 55 nm to 60 nm, and the thickness of each of the second dielectric layers is in a range of 75 nm to 85 nm,
the ratio of the refractive index of each of the first dielectric layers to the refractive index of each of the second dielectric layers is in a range of 1.25 to 1.35,
a material of the first dielectric layers comprises silicon nitride, and a material of the second dielectric layers comprises silicon oxide.

* * * * *